April 10, 1956     J. M. PESTARINI     2,741,731
ELECTRIC POWER SYSTEM FOR MOTORS
Original Filed Dec. 20, 1946
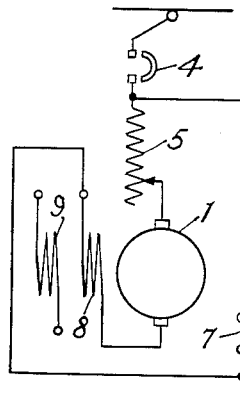
FIG.1
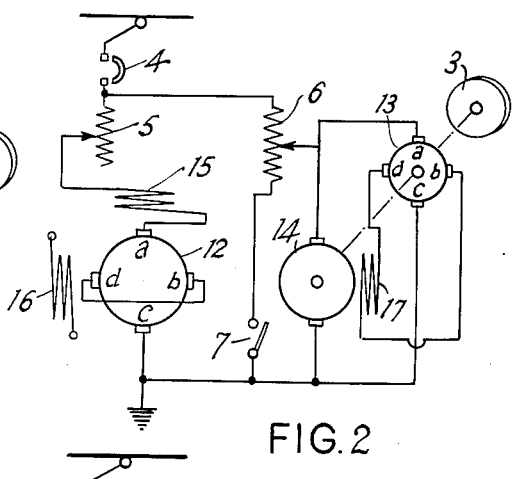
FIG.2
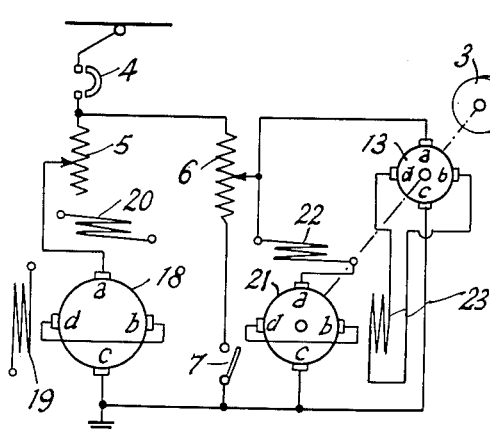
FIG.3
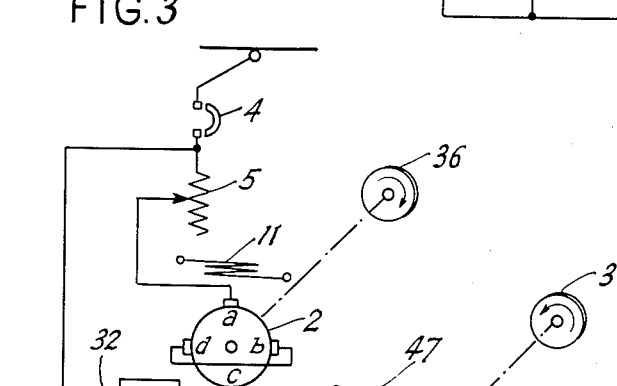
FIG.4
FIG.5
INVENTOR.
Joseph M. Pestarini
BY Philip G. Hilbert
ATTORNEY

United States Patent Office 2,741,731
Patented Apr. 10, 1956

2,741,731
ELECTRIC POWER SYSTEM FOR MOTORS

Joseph M. Pestarini, Staten Island, N. Y.

Original application December 20, 1946, Serial No. 717,505, now Patent No. 2,587,648, dated March 4, 1952. Divided and this application February 29, 1952, Serial No. 274,233

5 Claims. (Cl. 318—150)

This invention relates to electric power systems and more particularly to traction systems using a direct current overhead line together with electrical equipment where electric energy is transformed into kinetic energy and stored until it may be desirable to transform such energy back into electrical energy for utilization by the equipment.

An object of this invention is to provide motor means for interchangeably transforming electrical energy into kinetic energy, together with means for controlling the power flow in either form of transformation in accordance with predetermined conditions.

A further object of this invention is to provide motor means of the character described adapted to rotate at variable speeds within a predetermined range of speeds, together with means for dissipating electrical energy in the form of heat in the event that the maximum speed of the motor means is reached before the braking stage is complete.

Another object of this invention is to provide an electric power system including propulsion motors, a current source and variable speed rotating electrical machines, together with improved dynamoelectric means for controlling the power interchange therebetween.

Other objects of this invention will in part be obvious and in part hereinafter pointed out.

In the drawings, Fig. 1 shows an electric power system embodying the invention; Figs. 2, 3, 4 and 5 show modifications thereof.

In Fig. 1, 1 designates a propulsion motor or dynamo having a series field winding 8 and an independently energized field winding 9. Connected in parallel with dynamo 1 is a variable speed electrical machine 2. Machine 2, which may be of the metadyne type more fully disclosed in application Ser. No. 698,372, filed September 20, 1946, now Patent 2,642,556 comprises essentially an armature provided with a set of primary brushes $a$, $c$, a set of secondary brushes short circuited and displaced from said primary brushes and an independently energized stator winding 11 having its magnetic axis coincident with the commutating axis of the primary brushes. The machine 2 is adapted to absorb or supply current through the control of the ampere turns of stator winding 11.

The dynamo 1 and machine 2 are connected to a direct current source, such as an overhead line, as indicated in Fig. 1, through a contactor 4. Rheostats 5, 6 are connected in series with dynamo 1, and machine 2, respectively, for starting the same. A switch 7 is interposed between the series connected rheostats 5, 6 and dynamo 1, for the purpose hereinafter appearing.

Assuming that the system of Fig. 1 constitutes the motive equipment of an electric traction system, the operation thereof passes through a starting and accelerating stage, a coasting stage and a braking stage. With dynamo 1 and metadyne 2 at rest, switch 7 is left open and rheostats 5, 6 are set at maximum resistance. Switch or contactor 4 is closed to energize dynamo 1 and metadyne 2 with current supplied by the line and starting the same.

Rheostats 5, 6 are then operated to cut out resistance to provide normal operation of the machines. The current delivered by the line comprises one portion supplied to dynamo 1 and its intensity depending only on the speed of said dynamo and the selected energization of field winding 9, while the other portion of line current is supplied to methadyne 2, the intensity thereof being independent of the speed of said metadyne, as more specifically explained in Patent 2,642,556, and depending on the ampere turns of stator winding 11. The metadyne current is substantially proportional to the ampere turns of said winding and changes direction as the ampere turns change direction. Thus, by setting the ampere turns of winding 11, the metadyne may be caused to absorb or supply a predetermined current, thereby accelerating or decelerating flywheel 3 accordingly.

Metadyne 2 is therefore rotating at a speed which is independent of the speed of the traction vehicle and may vary between a maximum safe speed and a minimum operating speed necessary for proper operation of said metadyne. When flywheel 3 accelerates it stores energy and metadyne 2 absorbs current; whereas when said flywheel decelerates it supplies energy and said metadyne supplies current irrespective of the voltage, provided it does not substantially exceed the line voltage, which is an important property of metadyne 2, as more fully explained in Patent 2,642,556.

Thus, during the accelerating stage, the winding 11 is energized in such a direction as to cause metadyne 2 to supply current with mechanical energy being supplied by the decelerating flywheel. Switch 4 may be closed, in which case the line will supply the difference between the current absorbed by the dynamo 1 and the current supplied by metadyne 2. Switch 4 may be opened and then dynamo 1 absorbs only the current supplied by said metadyne until the flywheel reaches its minimum speed, after which, switch 4 must be closed.

During the braking stage, winding 11 is energized in the opposite direction so as to cause metadyne 2 to absorb current and accelerate flywheel 3. Switch 4 may be closed, in which case the line will receive only the difference between the current supplied by dynamo 1 and the current absorbed by said metadyne. Switch 4 may also be opened and then dynamo 1 will supply exactly the current absorbed by said metadyne until flywheel 3 reaches its maximum safe speed, beyond which either switch 4 must be closed, or alternatively, switch 7 is closed and rheostats 5, 6 set to dissipate the excess power supplied by dynamo 1. Accordingly the traction vehicle may be braked with switch 4 open and when flywheel 3 has reached its maximum safe speed and no longer can store additional amounts of mechanical energy.

It will be apparent that during the accelerating and braking stages, the flywheel may rotate at its maximum safe speed at the initiation of the accelerating stage and at its minimum speed at the start of the braking stage. Intermediate thereof, in the coasting stage, the dynamo 1 is idle and generally, rheostat 5 is set at its maximum resistance. If the traction vehicle is to be braked and if the flywheel 3 rotates at a speed greater than the minimum speed, the ampere turns of winding 11 are set to cause metadyne 2 to supply current to the line and thus decelerate the flywheel until its minimum speed is reached.

If the traction vehicle must be again accelerated and the flywheel is rotating at less than its maximum safe speed, the ampere turns of winding 11 are set so as to cause metadyne 2 to absorb or receive current from the line and thus accelerate the flywheel until its maximum safe speed is reached.

Summarizing, during the braking stage, the electrical energy supplied by dynamo 1 is partially returned to the overhead line and partially supplied to the machine 2 where it is transformed into kinetic energy and increases the speed of flywheel 3. Alternatively, all the electrical energy may be absorbed by machine 2, in which event contactor 4 may be opened. Should the maximum safe speed of the flywheel 3 be reached before braking is completed, and no power is to be returned to the overhead line, then the surplus power supplied by dynamo 1 may be dissipated in the form of heat in rheostats 5, 6, by closing switch 7.

During the motoring stage, machine 2 transforms the kinetic energy of its rotating mass into electrical energy for supply to dynamo 1 and to the overhead line when contactor 4 is closed. If the contactor 4 is opened, the electrical power supplied by machine 2 will be completely absorbed by dynamo 1. In starting the dynamo 1, the contactor 4 may be left open and the current input to the dynamo will be controlled through the operation of machine 2, since machine 2 is adapted to automatically supply the voltage required by dynamo 1. When such supplied voltage has a value equal to that of the overhead line, the contactor 4 may be closed, thus connecting the dynamo to the overhead line.

It is noted that metadyne 2 operates as a motor when flywheel 3 is accelerated, and as a generator when said flywheel is decelerated, in accordance with the direction of the ampere turns of winding 11. Furthermore, while the current absorbed or supplied by the metadyne remains substantially constant if the ampere turns of the winding 11 are kept constant, the voltage induced by said metadyne may have any direction and any value ranging from zero and maximum for the metadyne, yet metadyne 2 will operate at a voltage value corresponding to the voltage value of dynamo 1 and cause said dynamo to be energized with a current determined by the ampere turns of winding 11.

Thus, as long as switch 4 is closed, the voltage induced by metadyne 2 will be substantially equal to the line voltage; when switch 4 is opened, the metadyne voltage will be substantially equal to that of the dynamo 1 and may be greater than the line voltage if the traction vehicle is running at high speed and the dynamo is subjected to strong excitation. Finally, the metadyne voltage may approach zero when the traction vehicle operates at low speeds.

If switch 4 is closed, dynamo 1 will operate as a motor and accelerate the traction vehicle when the ampere turns of field winding 9 induce an electromotive force less than the line voltage and will operate as a generator and brake the vehicle when said ampere turns induce an electromotive force greater than the line voltage.

If switch 4 is opened, dynamo 1 will operate as a motor and accelerate the vehicle if the ampere turns of winding 11 cause metadyne 2 to supply current, energy being taken from the decelerating flywheel and will operate as a generator with braking action if the ampere turns of winding 11 are reversed in direction causing the metadyne to absorb current and to accelerate the flywheel which then stores increased amounts of mechanical energy.

As more specifically disclosed in Patent 2,642,556, and also in Patent 2,593,482, machine 2 is adapted to automatically supply or absorb any voltage value required or imposed thereon, providing any desired current through suitable regulation of the ampere turns of stator winding 11. Thus, the machine may be caused to operate in accordance with any desired current pattern. The winding 11 may be made up of two or more members, each member being traversed by a separate control current whereby the composite effect produces a desired pattern.

The control current supplied to stator winding 11 may be automatically controlled in response to variations in speed of machine 2, by the use of suitable speed responsive devices coupled to machine 2 and generally indicated at 10 in Fig. 1. Such devices may supply control current to winding 11 whereby the operation of machine 2 is maintained within a predetermined range of values corresponding to a predetermined range of speeds. One such device 10 may take the form of a rotating electric machine providing current peaks at the opposite limits of said range of speeds, as more fully described in application Ser. No. 712,629, filed November 27, 1946. The current peaks thus produced may energize relays controlling the current input to winding 11 or may directly traverse members of such winding.

In Fig. 2, a dynamoelectric machine 12 of the metadyne type, more fully described in application Ser. No. 707,699, filed November 4, 1946, now Patent 2,662,999, is connected in parallel with a variable speed dynamo 14. The machine 12 comprises essentially an armature provided with a pair of primary brushes *a, c,* a pair of short circuited secondary brushes *b, d,* displaced therefrom, a stator winding 15 in series with brush *a* and the overhead line and an independently energized stator winding 16.

The winding 15, whose magnetic axis coincides with the commutating axis of the primary brushes, may provide an arbitrarily selected degree of over or under compensation to suit a selected pattern of operation. Thus, if the winding provides less than 100% compensation, the torque speed characteristic of machine 12 will be similar to that of a compound motor, the winding creating an electromotive force in opposition to the current. If the winding provides more than 100% compensation, the characteristic will be similar to that of a compound generator and the winding will create an electromotive force additive to the current. If the compensation is exactly 100%, the characteristic will be similar to that of a separately excited dynamo.

The dynamo 14 includes a field winding 17 which is energized by an exciter 13, of the metadyne type more fully described in application Ser. No. 715,792, filed December 12, 1946. Such exciter comprises essentially an armature with a pair of primary brushes *a, c* connected to the brushes of the dynamo 14 and a pair of secondary brushes *b, d* displaced from the primary brushes and connected to winding 17. Starting rheostats 5, 6, contactor 4, switch 7 and flywheel 3 which is coupled to dynamo 14 and exciter 13, complete the system. The rheostats 5, 6 may be used to dissipate electrical energy during the braking stage of operation, as described in connection with Fig. 1.

In the system of Fig. 2, during the accelerating stage, metadyne 12 operates as a motor, the starting torque resulting from the ampere turns created by winding 16 in relation to the armature current traversing brushes *a, c* of said metadyne. After starting and when rheostat 5 has been cut out, acceleration continues with metadyne 12 absorbing current through brushes *a, c* as determined by the turns of winding 15 which has an under compensating function and the current increasing as the percentage of compensation increases. Thereafter, winding 16 may be deenergized and the current traversing brushes *b, d* of metadyne 12 will automatically insure proper excitation. If winding 16 remains energized, the operation is the same, except that the current traversing brushes *b, d* is reduced.

Dynamo 14 is similarly started through rheostat 6 and when the rheostat is cut out, the dynamo operates normally. At such time, metadyne exciter 13 supplies to excitation winding 17 a current which is inversely proportional to the speed of flywheel 3, thus keeping the voltage of dynamo 14 constant despite variation in speed. The current that dynamo 14 will supply or absorb depends on the ampere turns of winding 17. Thus, the dynamo will supply current, thereby transforming the mechanical energy stored in the flywheel, into electrical energy, as the flywheel speed reaches its minimum value. While the dynamo is thus operating, the line will furnish only the difference between the current absorbed by metadyne 12 and the current supplied by said dynamo.

Acceleration may also be carried out with switch 4 open, in which case the current absorbed by metadyne 12, determined by the ampere turns of winding 15, is equal to the current supplied by dynamo 14, thereby transforming mechanical energy stored in the flywheel, into electrical energy.

The braking action is obtained by increasing the ampere turns of winding 15 so as to cause said winding to have an over compensating function, in which case the current traversing brushes $a$, $c$ of metadyne 12 is supplied by said metadyne. Winding 16 may be energized or deenergized, as previously described.

Dynamo 14 will absorb current by reducing the ampere turns of winding 17 and will accelerate flywheel 3 and storing mechanical energy therein until a maximum speed is reached. If switch 4 is closed, the line will absorb only the difference between the current supplied by metadyne 12 and that absorbed by dynamo 14. If switch 4 is opened, the current supplied by metadyne 12 determined by the ampere turns of winding 15, is equal to the current absorbed by dynamo 14. If during this operation, the flywheel speed reaches its maximum value, dynamo 14 will idle and the energy recuperated by metadyne 12 is dissipated by means of rheostats 5, 6, switch 7 being closed.

During the coasting stage, the system operates in a manner similar to that described in connection with the system shown in Fig. 1.

In Fig. 3, the propulsion motor takes the form of machine 18, which is similar to machine 2, shown in Fig. 1, and includes current control means as a stator winding 20 whose magnetic axis is coincident with the commutating axis of the primary brushes and is independently energized, and starting torque control means in the form of independently energized stator winding 19 whose magnetic axis is coincident with the commutating axis of the secondary brushes.

The machine 18 is connected in parallel with a machine 21 which is similar to machine 12 shown in Fig. 2, and includes a stator winding 22 connected in series with the primary brushes $a$, $c$ and having its magnetic axis coincident with the commutating axis of the primary brushes, and a stator winding 23 whose magnetic axis is coincident with the commutating axis of the secondary brushes. The winding 23 is connected to the secondary brushes of an exciter 13 whose primary brushes are connected to the primary brushes of machine 21. The winding 22 is preferably of the undercompensating type.

The operation of the system shown in Fig. 3, is similar to that described in connection with Figs. 1 and 2. During the accelerating stage, metadyne 18 will operate as a motor, the current absorbed being determined by the ampere turns of winding 20 and the metadyne 21 will supply current, the value of which is determined by the ampere turns of winding 22 having an overcompensating function. The ampere turns of winding 23 will determine the value of the current traversing brushes $b$, $d$ of metadyne 21. As previously described, switch 4 may be open or closed.

During the braking stage, metadyne 18 will operate as a generator, the current supplied being determined by the ampere turns of winding 20 in a direction opposite to that when in the accelerating stage. The metadyne 21 will operate as a motor, accelerating the flywheel 3. The current absorbed by metadyne 21 is determined by the ampere turns of winding 22, which in this case, has an undercompensating function. As in the previous cases, switch 4 may be open or closed. The action of metadyne exciter 13 on metadyne 21 is responsible for a reduction in the current traversing the short circuited brushes $b$, $d$ thereof.

In the preceding examples, the machine coupled to the flywheel and the motor driving the traction vehicle, are connected in parallel. The same units may be connected in series with one another, for operation in a manner similar to that of previously described examples.

As shown in Fig. 4, a pair of similar, variable speed machines 2, 45 are respectively connected in series with similar dynamos or propulsion motors 1, 25, respectively. The machines 2, 45 include similar control stator windings 11, 47 respectively and dynamos 1, 25 include similar field windings 9, 27 respectively. The machines 2, 45 have flywheels 36, 3 respectively coupled thereto and rotating in opposite directions. The interconnected machines are connected to the overhead line through contactor 4 with starting rheostat 5 in series with machines 2, 45. Switches 7, when closed allow excess electrical energy to be dissipated in rheostat 5, when contactor 4 is opened. With the indicated arrangement, the current may be properly distributed at all times between the dynamos 1, 25.

As shown in Fig. 5, the machine 2 is connected in series with parallel connected dynamo 1 and machine 45. Rheostat 5 is in series with machine 2 and a resistor 32 is connected across dynamo 1 and machine 45 with switch 34 interposed. During braking, excess electrical energy may be dissipated as heat in rheostat 5 and resistor 32, by closing switches 7, 34 and leaving contactor 4 open.

It will be apparent that in the embodiments of the invention shown and described above, the propulsion motors or dynamos, which have accelerating and decelerating periods, are interconnected with a current source and variable speed machines which are adapted to interchangeably convert electrical energy into kinetic energy under conditions such as to allow for automatic control of the power absorbed by or supplied to the motors or dynamos, independently of the speed thereof.

It is apparent that in the combination of electrical machines and mechanical energy storing means, as disclosed herein and distinguished by a substantial reduction in the oscillation of the power supplied by the electric network despite periodic accelerating and decelerating stages of vehicles utilizing such machines, various specific forms of such electrical machines may be utilized, as set forth in Patents 2,642,556 and 2,662,999. Furthermore, the control of such machines may be specifically effected by various forms of stator windings as set forth in said patents. While the systems disclosed have been described in connection with traction systems, it is obvious that they may be used wherever periodic movements with accelerating and decelerating stages may be encountered, as in rolling mills, elevators, hoists and the like.

This application is a division of application Ser. No. 717,505, filed December 20, 1946, now Patent 2,587,648.

It is understood that all matter herein set forth or shown in the accompanying drawing is to be interpreted as illustrative and not in a limiting sense except as indicated in the claims following.

Having thus described my invention, I claim as new and desire to protect by Letters Patent:

1. An electric power system comprising a current source, a rotating electric machine having periods of acceleration and deceleration and a variable speed electric machine, at least one of said machines comprising a metadyne having a commutator with a pair of primary brushes and a pair of short circuited secondary brushes associated therewith and a control stator winding, circuit means connecting the armatures of said machines in parallel, circuit means connecting said current source to the interconnected armatures of said machines, said stator winding being operative upon energization thereof in one direction during the accelerating period of said first machine and at higher rates of speed of said metadyne to cause said metadyne to supply to the other machine the entire current requirement thereof, and at lower rates of speed of said metadyne to cause said metadyne to supply to the other machine current equal to the difference between the current requirement of said other machine and the current supplied by said current source, said stator winding being further operative upon energization thereof in the opposite direction during the decelerating period of said first machine and at lower rates of speed to cause said metadyne to absorb the current output of said other machine and at hgher rates of speed to cause said metadyne to absorb a portion of the current output of said other machine, the remainder of said current output being supplied to said current source.

2. A power system as in claim 1 and further including means for controllably energizing said stator winding to regulate the ampere turns thereof, comprising a metadyne exciter having an armature with a pair of primary brushes and a pair of secondary brushes associated therewith, said last mentioned primary brushes being in circuit with the primary brushes of said metadyne and circuit means connecting said last mentioned secondary brushes with said stator winding.

3. A power system as in claim 1, wherein said first mentioned machine includes a second stator winding in series circuit with said primary brushes.

4. A power system as in claim 1, wherein said machines are in series circuit.

5. A power system as in claim 4, and further including a second variable speed machine in parallel circuit with said first mentioned machine.

References Cited in the file of this patent

UNITED STATES PATENTS

| | | |
|---|---|---|
| 674,825 | De Castro | May 21, 1901 |
| 1,530,172 | Hansen | Mar. 17, 1925 |
| 2,465,226 | Harris | Mar. 22, 1949 |